United States Patent
Marx et al.

(10) Patent No.: US 10,113,908 B1
(45) Date of Patent: Oct. 30, 2018

(54) SYSTEM AND METHOD OF OPTICAL AXIS ALIGNMENT MONITOR AND FEEDBACK CONTROL FOR A SPECTROMETER

(71) Applicant: The United States of America as represented by the Administrator of NASA, Washington, DC (US)

(72) Inventors: Catherine Marx, Laurel, MD (US); Irving Linares, Columbia, MD (US); Peter Shu, Chevy Chase, MD (US); James Smith, Lanham, MD (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 15/714,568

(22) Filed: Sep. 25, 2017

(51) Int. Cl.
*G01J 3/28* (2006.01)
*G01J 3/02* (2006.01)

(52) U.S. Cl.
CPC .............. *G01J 3/0289* (2013.01); *G01J 3/027* (2013.01); *G01J 3/0208* (2013.01); *G01J 3/2803* (2013.01); *G01J 3/2823* (2013.01)

(58) Field of Classification Search
CPC ........ G01J 3/0289; G01J 3/0208; G01J 3/027; G01J 3/2803; G01J 3/2823
See application file for complete search history.

(56) References Cited

U.S. PATENT DOCUMENTS

2014/0104618 A1* 4/2014 Potsaid .............. G02B 26/105
356/497

* cited by examiner

*Primary Examiner* — Jamil Ahmed
(74) *Attorney, Agent, or Firm* — Christopher O. Edwards; Bryan A. Geurts; Mark P. Dvorscak

(57) ABSTRACT

The present invention relates to an apparatus and method of a real-time, monitoring and control feedback system for a 2-D spectrometer application, to correct for active optical axis pointing misalignments or jitter (i.e., tip, tilt), that result in degraded scientific image integrity, unwanted spatial crosstalk and image blurring artifacts which severely limit the applications for high resolution spectrometer image data. The present invention provides a unique system architecture which ensures the most direct optical axis motion detection and control capability that will enable sub-pixel image motion monitoring and boresight control stability, thus, maximizing the science image quality.

38 Claims, 5 Drawing Sheets

ROLL DETECTION AND MEASUREMENT STRATEGY UTILIZING DUAL ALIGNMENT BEACONS

SYSTEM AND METHOD OF OPTICAL AXIS ALIGNMENT MONITOR AND FEEDBACK CONTROL FOR A SPECTROMETER

ORIGIN OF THE INVENTION

The invention described herein was made by an employee of the United States Government, and may be manufactured or used by or for the Government for governmental purposes without the payment of any royalties thereon or therefor.

BACKGROUND OF THE INVENTION

1. Field of the Invention

The present invention is related to providing a real time optical axis alignment monitor and feedback control system for a 2-dimensional (2-D) push-broom spectrometer application, to correct for internal optical component motions that would induce boresight pointing errors and image blurring during the scene sampling integration period.

2. Description of the Related Art

Uncompensated optical axis motions introduce unwanted imaging misalignments and image blurring artifacts, thus, highly degrading high-resolution science image data. In addition, current ground image processing techniques are unable to isolate these image motion effects, and thus, they remain as uncorrectable and undesired image artifacts (e.g., spectral and spatial blurring—i.e., crosstalk).

Current focal plane image monitoring and stabilization control techniques involve implementing a totally separate 2-D focal plane image monitoring and control system. This greatly increases the required instrumentation resources load (mass, power, volume, complexity, and funding), and is therefore, highly undesirable for today's resource-limited applications.

Further, there is no known real-time image collection and correction technique that simultaneously uses the same focal plane imaging detector components to both control the optical system boresight alignment and collect the scientific imaging data.

Thus, a real time optical image alignment and control system that simultaneously accommodates the combined focal plane functions of science image collection and image stabilization control, is needed.

SUMMARY OF THE INVENTION

The present invention relates to a system and method of a real-time, monitoring and control feedback system for a 2-D spectrometer application, to correct for active optical axis pointing misalignments or jitter (i.e., tip, tilt), that result in degraded scientific image integrity and unwanted spatial crosstalk and imaging blurring artifacts which severely limit the applications for science image data. The present invention provides a unique system architecture which ensures the most direct optical axis motion detection and correction control capability that will enable sub-pixel image motion monitoring and boresight control stability, thus, maximizing the science image quality.

In one embodiment, the spectrometer application of the present invention includes a wavelength-specific single axis linear array detector column embedded in a two-dimensional (2-D) spectrometer array, and at least one optical alignment beacon which is positioned, constrained and directed along the central optical axis of the input aperture. In one embodiment, the beacon is rigidly mounted to the input aperture of the 2-D spectrometer system. The beacon output beam pointing axis serves as the system optical axis boresight datum. The light output from the beacon is directed along this boresight datum, which is co-axial with the receiver optical path. The alignment beam imaged is focused onto a focal plane of the 2-D spectrometer detector array and registered at the beacon beam output wavelength-specific detector column (i.e., linear array detector column), which is 1064 nm for one embodiment of the present invention.

In one embodiment, the light from the beacon focused on the focal plane of the linear array detector column illuminates a section of the linear array detector column, such that the linear array detector column intersects the circular beacon image through an offset chord intersection (i.e., not along a circular diameter chord), and any jitter motions of system optical components positioned between the alignment beacon (input aperture datum) and the focal plane appear as motions of a beacon image on the wavelength-specific linear array detector column.

In one embodiment, a fast steering mirror (FSM) is located in series with the optical axis of the beacon and the incoming ground scene radiance from the input aperture. The FSM is able to alter the optical pointing directions of the incoming radiances in two axes, denoted "tip" and "tilt"—i.e., two rotation axes about an X-Y plane that is orthogonal to the system central optical axis.

In one embodiment, the FSM directs and relays these illumination sources onto a turning mirror. The reflection off the turning mirror relays the incoming radiance to the system focusing optics and field-stop. The system optics focuses the radiance sources (ground scene and beacon source images) onto the system field-stop slit. This narrow rectangular field-stop slit forms the observed cross-track ground scene spatial image; i.e., a one-dimensional (1-D) cross-track line image; hence, "push-broom". The exiting radiance through the field-stop slit area is then spectrally partitioned, typically via a prism or a grating, etc. into a specified range—i.e., 350 nm to 1064 nm, in one embodiment. This spectral partition is directed (i.e., wavelength dispersion axis) orthogonal to the spatial cross-track image axis. The resultant 2-D, spatial and spectral radiance is then focused onto the system focal plane; i.e., the 2-D detector array. The column elements (pixels) of the 2-D array form the observable spatial scene (i.e., the narrow, rectangular, cross-track ground scene image) and the detector array row elements (pixels) sample the spectral content (pixel by pixel) of the ground scene image.

In one embodiment, the misalignments due to optical axis motions translate into a change in each of an illuminated segment length and an illuminated segment centroid location along an axis of the linear array wavelength-specific detector column; and the change in the illuminated segment length of the linear array detector column indicates motion of the beacon in one axis, and the change in the illuminated segment centroid location along the linear array detector column indicates motion in another orthogonal axis, to indicate "tip" and "tilt" optical axis motions.

In one embodiment, to implement the monitoring and control system of the spectrometer application, an optical axis pointing control system monitors and controls a vector alignment of the input aperture boresight datum (alignment beacon mounting location) and the 2-D spectrometer detector focal plane. The present invention utilizes a detector array readout "windowing" capability to independently control and readout the wavelength specific linear array detector column at a readout cadence (i.e., nominally 100 Hz to 1 kHz frame rate). The remaining detector array columns may be readout at a different and notionally much slower frame rate, i.e., 0.1 Hz to 1 Hz frame rate. These array windowing readout functions are controlled by dedicated array readout control electronics.

Accordingly, in one embodiment, changes in the optical axis pointing direction (pointing jitter) due to unwanted optical component motions can be uniquely and unambiguously registered and parameterized sufficient to derive the necessary feedback control signals (via closed-loop processing algorithms) for the in-line FSM to correct and null-out unwanted image jitter motions and thus, restore focal plane image stability.

In one embodiment, a monitoring and control system for a spectrometer, includes: a single axis, wavelength-specific linear array detector column embedded in a two-dimensional (2-D) spectrometer detector array; at least one optical alignment beacon positioned and directed along a central optical axis of an input aperture of an optical system; wherein the beacon outputs illumination directed along a receiver optical path; a fast steering mirror (FSM) provided in series with the optical axis of the beacon and an incoming ground scene radiance from the input aperture; wherein the FSM alters optical pointing directions of radiance sources including the incoming ground scene radiance and the beacon illumination, in two axes denoted tip and tilt axes; a turning mirror which reflects the radiance sources to focusing optics and a field stop slit of a field stop assembly; wherein exiting radiance from the field-stop assembly is spectrally partitioned and directed orthogonal to a spatial cross-track image axis and focused onto the 2-D spectrometer detector array; and wherein changes in tip and tilt optical axis motions are registered and parametrized to derive a feedback control signal from a feedback control system, for the FSM to provide corrective motions to image jitter, and to restore focal plane image stability.

In one embodiment, the beacon is rigidly mounted to the input aperture and a pointing axis of the beacon output illumination serves as an optical axis boresight datum which is coaxial with the receiver optical path; and the output illumination from the beacon is directed along the optical axis boresight datum, and re-imaged onto a focal plane of the 2-D spectrometer detector array, and registered at the wavelength-specific linear array detector column.

In one embodiment, the output illumination from the beacon focused on the focal plane of the 2-D spectrometer detector array illuminates a segment of the linear array detector column; and wherein jitter motions of optical components positioned between the alignment beacon and the focal plane appear as motions of a beacon image on the wavelength-specific linear array detector column.

In one embodiment, the misalignments in the optical axis motions translate into a change in each of an illuminated segment length and an illuminated segment centroid location along an axis of the wavelength-specific linear array detector column; and the change in the illuminated segment length of the wavelength-specific linear array detector column indicates motion of the beacon in one axis, and the change in the illuminated segment centroid location along the linear array detector column indicates motion in a second orthogonal axis, to indicate the tip and tilt optical axis motions.

In one embodiment, the beacon is aligned on the focal plane such that the linear array detector column intersects a circular beacon image through an offset chord intersection, such that the changes in optical axis pointing direction are registered.

In one embodiment, the beacon operates in one of a continuous wave or a pulsed output mode.

In one embodiment, the monitoring and control system further includes: an optical axis pointing control system which monitors and controls a vector alignment of the optical axis boresight datum and the focal plane of the 2-D spectrometer detector array.

In one embodiment, the monitoring and control system further includes: a detector array control and readout which includes windowing capability to independently control and readout the wavelength-specific linear array detector column at a readout cadence; wherein array windowing readout functions are controlled by an array readout control electronics.

In one embodiment, changes in the illuminated segment length and the illuminated segment centroid location are recorded in a database; and the feedback control system translates the changes into the feedback control signal for the FSM to restore the beacon pointing back to an aligned focal plane position and the focal plane image stability.

In one embodiment, the linear array detector column collects alignment beacon image data in order to determine optical axis motion and image control information.

In one embodiment, two or more beacons are used, to enable detection of optical axis roll motions.

In one embodiment, the beacon includes one of a diffractive optical element (DOE), a micro-lens, or illuminated bifurcated fibers with fixed output collimation.

In one embodiment, two or more beacons are fixed and aligned to each other; and two or more beacons are spatially displaced at the focal plane and align along the length of a wavelength-specific detector array column.

In one embodiment, roll motion detection and correction signals are derived from relative motions of the two or more co-aligned beacons.

In one embodiment, the optical axis roll motions are detected by monitoring a change in a ratio between the illumination segment length of each of the two or more beacons that appear on the wavelength-specific detector array column, to indicate a roll direction and magnitude.

In one embodiment, an initial position reference of the illumination segment length of each of the two or more beacons on the wavelength-specific detector array column are established and provide known fixed length ratio datum.

In one embodiment, the change in ratio is parametrically characterized to derive the feedback control signal which is parametrically applied to the feedback control system, to reposition and null the beacon via a rotation restoration mechanism; and the optical axis pointing control system and the feedback control system form a closed loop control system to maintain a desired optical axis alignment.

In one embodiment, the 2-D spectrometer detector array is a push-broom spectrometer or a cross-track wisk-broom spectrometer; and the optical axis pointing control system of the 2-D spectrometer detector array is used at a geosynchronous observation platform which provides image pointing control of the focal plane of less than ±1 arcsec or ±½ pixel control.

In one embodiment, a method of monitoring and controlling a system for a spectrometer, includes: providing a single axis, wavelength-specific linear array detector column embedded in a two-dimensional (2-D) spectrometer detector array; positioning and directing at least one optical alignment beacon along a central optical axis of an input aperture of an optical system; directing illumination outputted from the beacon along a receiver optical path; providing a fast steering mirror (FSM) in series with the optical axis of the beacon and an incoming ground scene radiance from the input aperture; altering optical pointing directions of radiance sources including the incoming ground scene radiance and the beacon illumination, in two axes denoted tip and tilt axes, using the FSM; reflecting the radiance sources using a turning mirror, to focusing optics and a field stop slit of a field stop assembly; spectrally partitioning and directing exiting radiance from the field-stop assembly orthogonal to a spatial cross-track image axis and focusing onto the 2-D spectrometer detector array; and registering and parametrizing changes in tip and tilt optical axis motions to derive a feedback control signal from a feedback control system, for the FSM to provide corrective motions to image jitter, and to restore focal plane image stability.

In one embodiment, the method further includes: aligning the beacon on the focal plane such that the linear array detector column intersects a circular beacon image through an offset chord intersection, such that the changes in optical axis pointing direction are registered.

In one embodiment, the method further includes: monitoring and controlling a vector alignment of the optical axis boresight datum and the focal plane of the 2-D spectrometer detector array using an optical axis pointing control system.

In one embodiment, the method further includes: independently controlling and performing a readout of the wavelength-specific linear array detector column at a readout cadence using a detector array control and readout which includes windowing capability; wherein array windowing readout functions are controlled by an array readout control electronics.

In one embodiment, the method further includes: recording changes in the illuminated segment length and the illuminated segment centroid location in a database; and translating the changes into the feedback control signal, using the feedback control system, for the FSM to restore the beacon pointing back to an aligned focal plane position and preserve the focal plane image stability.

In one embodiment, the method further includes: collecting alignment beacon image data using the linear array detector column, in order to determine optical axis motion and image control information.

In one embodiment, the method further includes: deriving roll motion detection and correction signals from relative motions of the two or more co-aligned beacons.

In one embodiment, the method further includes: detecting the optical axis roll motions by monitoring a change in a ratio between the illumination segment length of each of the two or more beacons that appear on the wavelength-specific detector array column, to indicate a roll direction and magnitude.

In one embodiment, the method further includes: parametrically characterizing the change in ratio to derive the feedback control signal which is parametrically applied to the feedback control system, to reposition and null the beacon via a rotation restoration mechanism; wherein the optical axis pointing control system and the feedback control system form a closed loop control system to maintain a desired optical axis alignment.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The descriptions of the drawings are only exemplary embodiments of the disclosure and are not to be considered as limiting in scope.

FIG. 2A depicts the detector output response due to "tilt" component motions, according to one embodiment consistent with the present invention. FIG. 2B depicts the detector output response due to "tip" component motions, according to one embodiment consistent with the present invention.

FIG. 3B shows the control system performance plot of FIG. 3A while under the input jitter disturbances, in a continuous linear array output as a function of time, according to one embodiment consistent with the present invention.

DESCRIPTION OF THE INVENTION

Figure 1A:
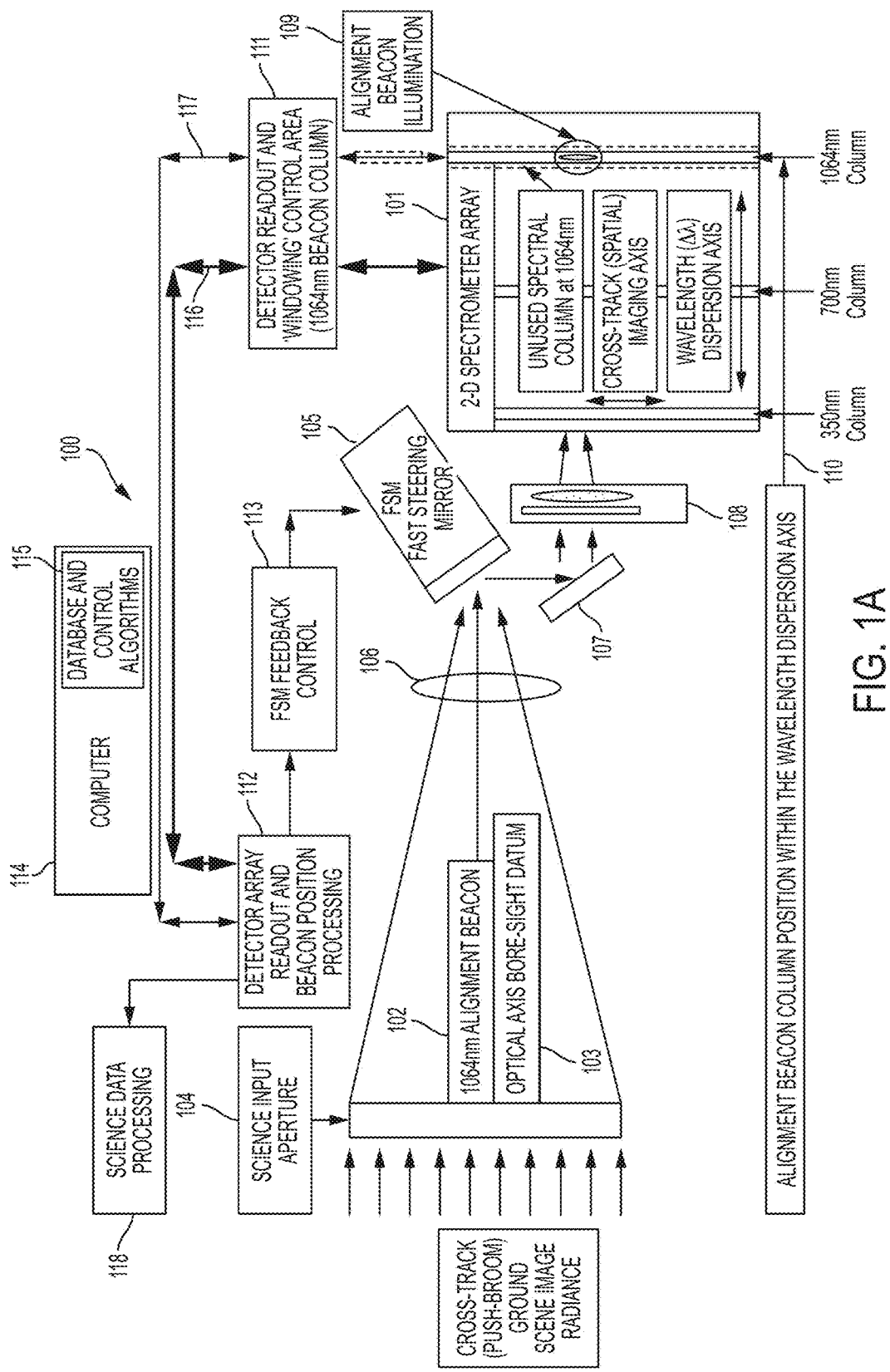
FIG. 1A shows a schematic block diagram of a push-broom spectrometer application for a closed-loop focal plane jitter monitor and fast-steering mirror (FSM) jitter correction control, according to one embodiment consistent with the present invention.

The present invention relates to an apparatus and method of a real-time, monitoring and control feedback system for a 2-D spectrometer application, to correct for active optical axis pointing misalignments or jitter (i.e., tip, tilt), that result in degraded scientific image integrity and unwanted spatial crosstalk and imaging blurring artifacts, which severely limit the applications for science image data. The present invention provides a unique system architecture which ensures the most direct optical axis motion detection and correction control capability that will enable sub-pixel image motion monitoring and boresight control stability, thus, maximizing the science image quality.

In one embodiment, the present invention relates to a push-broom spectrometer, which can be used, for example, in a spectrometer application at a geosynchronous orbit. In one exemplary embodiment, since geosynchronous instrument and spacecraft platform technology allows for approximately +/−1 kilometer (km) image stabilization (focal plane pixel control ±6 arcsec), and next-generation ocean coastal image resolution calls for less than 350 m resolution (baseline, 250 m goal), these requirements have contributed to the novelty of the novel present invention, which provides less than ±1 arcsec (±½ pixel) control from geosynchronous instruments and spacecraft control systems. Specifically, in one exemplary embodiment, the spectrometer of the present invention encompasses a 2-D push-broom spectrometer that utilizes a 2-axis mirror aperture (i.e., 30 cm diameter) with a ±9° pointing range to allow for full Earth disk observation coverage from geosynchronous orbit.

In one embodiment, the present invention includes a monitoring and control feedback system for a spectrometer application, which includes a 2-D detector array data readout which is capable of a "windowing" readout. That is, within the 2-D detector array, there exists a readout capability for independent, multiple (i.e., at least two in the application herein) detector readout areas (i.e., columns, as described herein). This feature enables the user to select different array readout cadences (i.e., output data frame rate) for different selected detector array areas. The detector frame rate for the science data will be science application specific in addition to instrument design parameters—i.e., scene resolution and radiometry, instrument aperture, detector responsivity, etc. The detector frame rate used for the alignment beam array column (wavelength specific) readout will be closely related to the expected disturbance source profiles (vibration magnitude and spectrum, etc.) that will be coupled into the instrument optical system structure during operation. The expected disturbance input profiles will also be observation platform specific (ground based, aircraft, spacecraft, etc.) and subject to the mounting interface coupling characteristics.

In one embodiment, the desired range of jitter motion detection and compensation control is consistent with key instrument hardware design parameters; i.e., fast steering mirror (FSM) motion range and resolution, instrument detector array pixel instantaneous field-of-view (IFOV), etc. In addition, the alignment beacon parameters (center wavelength and linewidth, beam divergence and pointing jitter, etc.) are consistent with the detector array parameters (pixel pitch, responsivity, etc.) to achieve the desired level of range and resolution control accuracies.

In one embodiment, the alignment beacon instrument mounting and pointing axis provides the optical jitter and pointing control reference datum. All detected optical motions are measured and controlled relative to this reference. These key instrument component parameters are consistent and factored into the overall instrument design architecture to ensure that proper motion monitor and control responsivity is achieved.

In one exemplary embodiment, the monitoring and control feedback system 100 of the present invention, which may be used for a push-broom spectrometer application, utilizes a single axis linear array detector column (i.e., 1064 nm column), embedded in a two-dimensional (2-D) science detector array 101 (see FIG. 1A).

In one exemplary embodiment, the alignment beacon 102 is positioned at the input aperture 104 of an optical system, and is directed along the receiver optical path (including instrument optics 106, 107, 108 (such as collimation, depolarization, focusing lenses and wavelength dispersing optics), and focused onto the beacon wavelength specific detector array column. The alignment beacon 102 is rigidly mounted to a non-moving yoke, including the instrument pointing reference/optical axis boresight datum 103, which holds the 2-axis pointing receiver aperture 104, and is directed along the system boresight axis, co-axial with the receiver optical path, and then re-imaged onto the focal plane spectrometer detector column(s), where it monitors the changes in instrument bore-sight/alignment relative to the alignment beam pointing axis.

In one embodiment, a fast steering mirror (FSM) 105 is located in series with the optical axis of the beacon 102 and the incoming ground scene radiance from the input aperture 104. The FSM 105 is able to alter the optical pointing directions of the incoming radiances in two axes, denoted "tip" and "tilt"—i.e., two rotation axes about an X-Y plane that is orthogonal to the system central optical axis. The optical beam path of the present invention includes the instrument optics 106, the FSM component 105 which reflects light from the beacon 102 (i.e., 1064 nm laser) toward a turning mirror 107 which reflects the light to a field stop with focus elements 108 of a science spectrometer detector array 101.

In one embodiment, the system optics 106 focuses the radiance sources (ground scene and beacon source images) onto the system field-stop slit 108. The light coming from the input aperture 104 is focused onto the narrow rectangular field-stop slit 108 and forms the observed cross-track ground scene spatial image—i.e., a one-dimensional (1-D) cross-track line image; hence "push-broom". The exiting radiance through the field-stop slit 108 area is then spectrally partitioned, typically via a prism or a grating, etc. into a specified range—i.e., 350 nm to 1064 nm. This spectral partition is directed (i.e., wavelength dispersion axis) orthogonal to the spatial cross-track image axis. The resultant 2-D, spatial and spectral radiance is then focused onto the system focal plane; i.e., the 2-D detector array 101. The column elements (pixels) of the 2-D array form the observable spatial scene (i.e., the narrow, rectangular, cross-track ground scene image) and the detector array row elements (pixels) sample the spectral content (pixel by pixel) of the ground scene image.

Figure 1B:
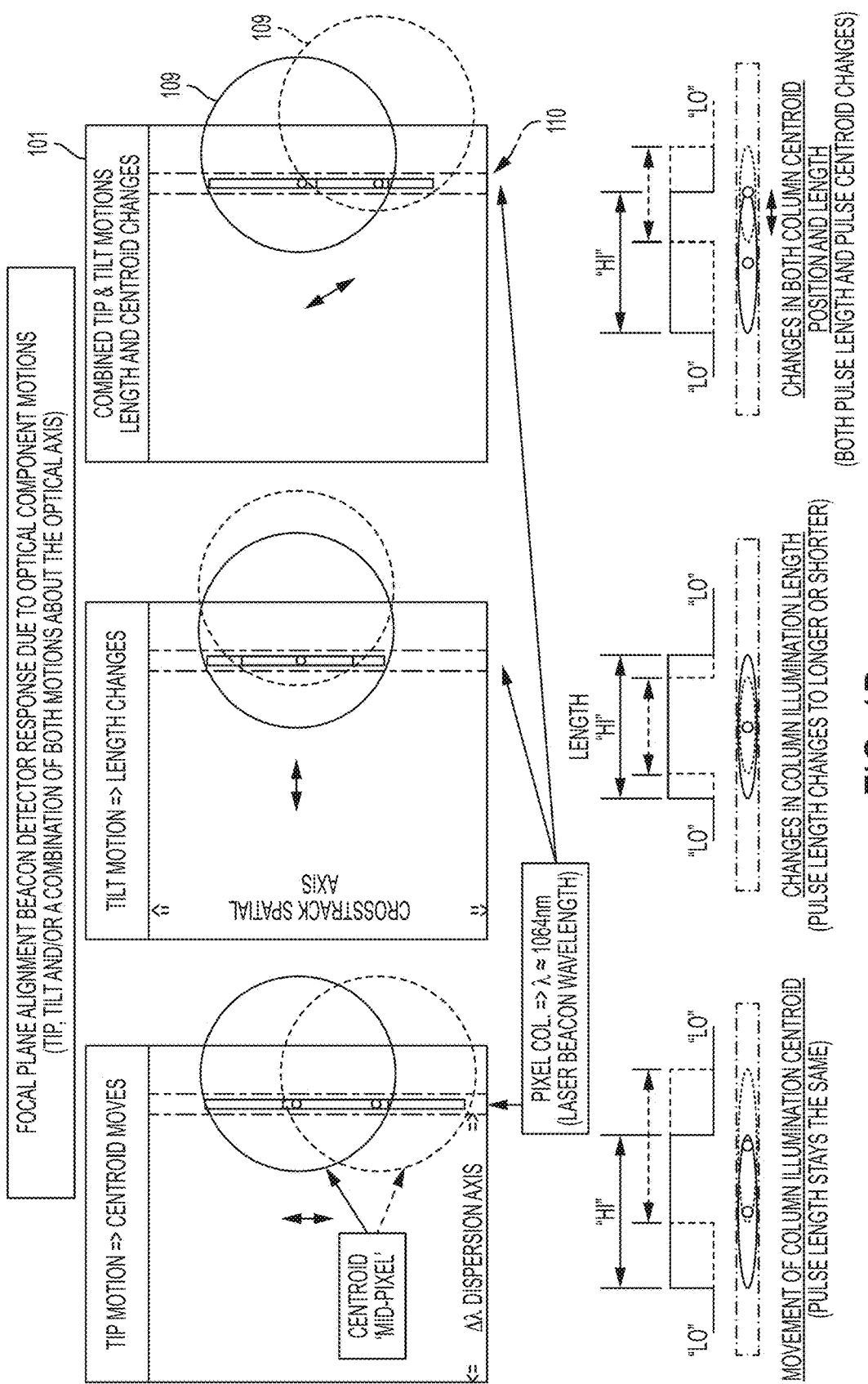
FIG. 1B shows multiple expanded spectrometer focal plane images, depicting how the alignment beacon image is focused onto the 2-D spectrometer detector array, according to one embodiment consistent with the present invention.

In one exemplary embodiment, the focused alignment beacon 102 will produce an illumination segment 109 of the detector array column located on the 2-D system 101 focal plane (see FIGS. 1A and 1B). The illuminated spectrometer column corresponds to the beacon illumination wavelength. Only this array column 110 will have an illuminated segment due to the very narrow beacon linewidth. The other adjacent array columns will not respond to the alignment beacon illumination 109, as long as the beacon optical emission bandwidth is less than the spectrometer dispersion resolution. The length of this illuminated column segment is proportional to alignment beam divergence, beacon initial optical axis alignment, and detector pixel instantaneous field-of-view (IFOV).

In one exemplary embodiment, the present invention utilizes the single spectral linear array detector column (i.e., 1064 nm column 110) to monitor and measure integrated 2-axis optical component alignment motions (i.e., tip, tilt) within a two-dimensional (2-D) spectrometer array 101. The beacon operating wavelength and optical bandwidth are selected and positioned well away from the wavelengths of science interest. In addition, the single spectral linear array column 110 of the present invention possesses the "windowing" operation capability 111 to run independently (i.e., at different frame-rate readout cadence 117) from the rest of the 2-D array spectrometer array 101 (readout cadence 116).

In one exemplary embodiment, optical component motions from all sources that are between the alignment beacon reference datum 103 and the focal plane detector array 101 and appear as alignment beacon image motions on the selected wavelength-specific linear array column 110. System optical axis motions that affect tilt, and tip misalignments, translate into changes in the illuminated segment length, and the segment length centroid location along the linear array detector column axis (see FIG. 1B). The specific beacon illuminated array column 101 segment length and centroid location measurements represent optical axis motions and will vary as the optical axis undergoes continuous oscillating tip and tilt changes (see FIGS. 2A and 2B).

Figures 2A, 2B:
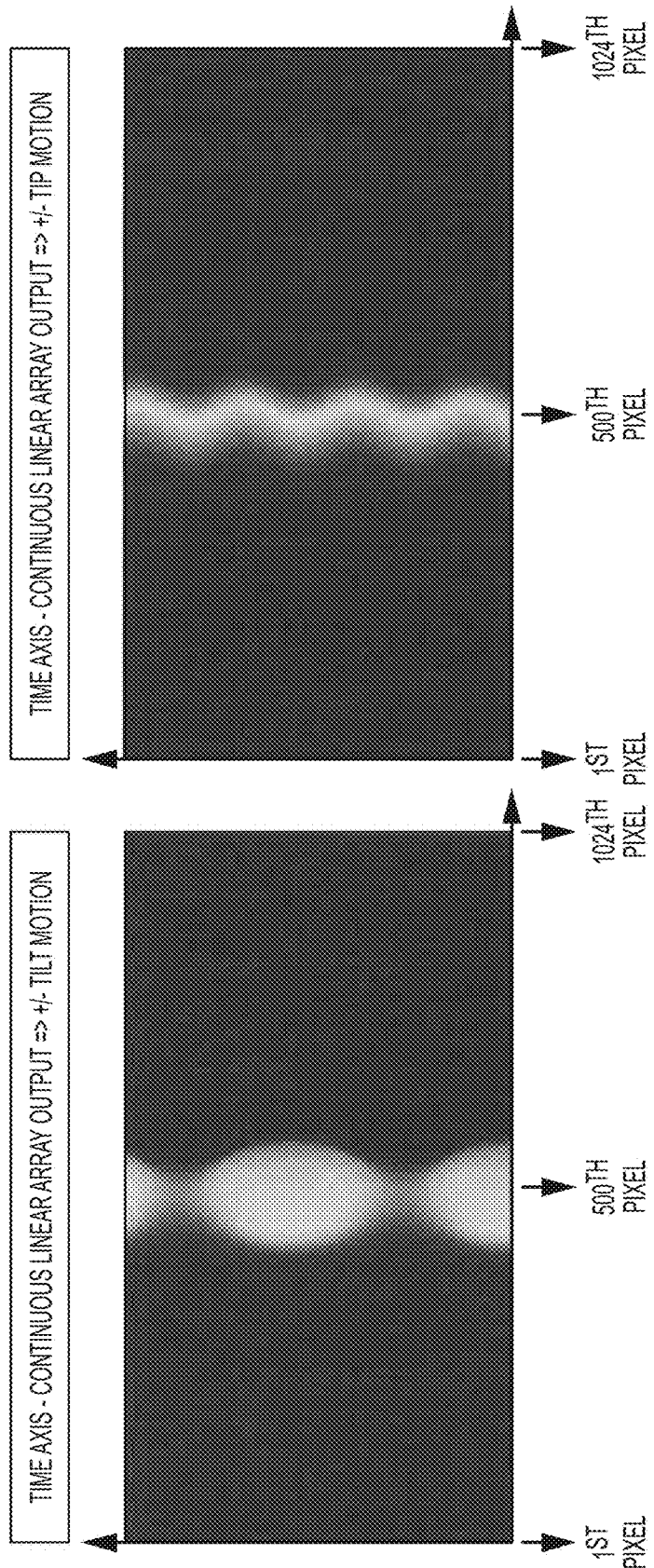
FIGS. 2A and 2B show plots of a continuous linear array output (one column of a 2-D spectrometer detector array) as a function of time, while undergoing optical component jitter excitation (tip and tilt disturbance motions).

In one exemplary embodiment, FIG. 2A shows a continuous linear array output on a time axis, and shows a change in the optical "tilt" axis. This indicates a change (over two continuous input disturbance cycles shown) in the intersected alignment beacon 102 length. This illuminated length segment varies approximately 10-100 pixels as the tilt axis disturbance magnitude varies at a repeating period.

In one exemplary embodiment, FIG. 2B shows a continuous linear array output on a time axis, and shows a change in the optical "tip" axis. This indicates a change (over three and a half continuous cycles shown) in the illuminated segment centroid location shifts. This centroid position shifts as the tilt axis disturbance magnitude varies at a repeating period.

In one exemplary embodiment, the 2-D detector array 101 (see FIG. 1A) data readout must be capable of a "windowing" readout capability 111, 117. That is, within the 2-D detector array 101, there should be a readout capability for independent, multiple (i.e., at least two in this exemplary application) detector readout areas (i.e., columns, in this exemplary application). This feature enables the user to select different array readout cadences (output data frame rate) for different selected detector array areas.

In one exemplary embodiment, in addition to the linear detector array 101, the optical alignment beacon 102, which includes a known beam divergence, and very narrow emission linewidth spectrally removed from the science region of interest, is located in series with the FSM 105 and with the instrument optical axis. The components are aligned such that tip and tilt optical axis motions (magnitude and spectrum) can be parametrized by the closed loop monitor and control electronic processors (i.e., control electronics 111, readout and position processing electronics 112, FSM feedback control 113, computer 114, database and control algorithms 115), and altered by the FSM 106 corrective motions.

Figures 3A, 3B:
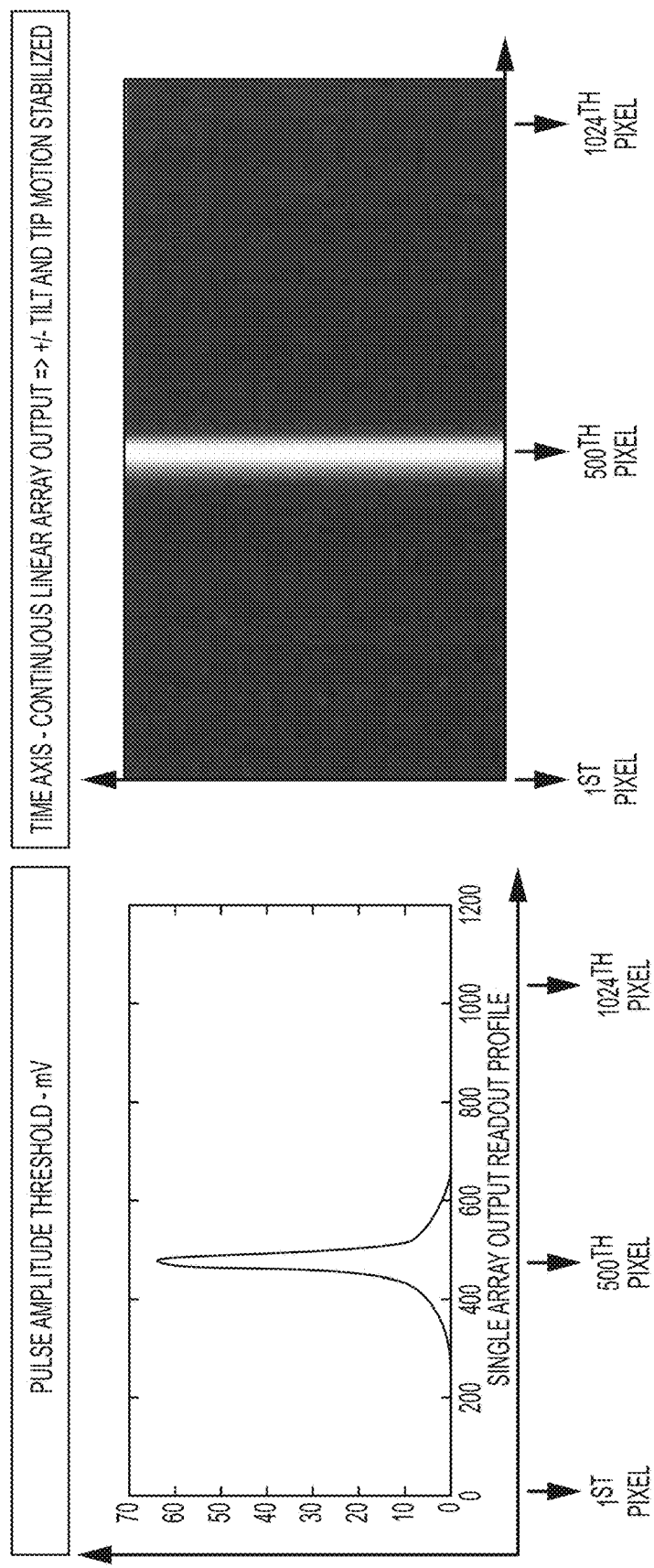
FIGS. 3A and 3B show a closed-loop control performance plot utilizing the fast-steering mirror (FSM), while under the input jitter disturbances depicted in FIG. 2A and FIG. 2B, in a single array column representation of the output readout profile, according to one embodiment consistent with the present invention.

In one exemplary embodiment, as shown in FIGS. 3A and 3B, based upon the error correction signals derived from the signal interactions of the alignment beacon 102 and the linear detector array 101, the 2-axis FSM optical component 105 provides the necessary tip/tilt optical axis alignment correction motions necessary to maintain a stable and fixed receiver optical pointing control.

In one exemplary embodiment, the FSM optical component 105 is an in-line (optical receiver path) correction mirror (i.e., 2-axis piezo-transducer (PZT) mirror with approximately ±3° tip/tilt motion control range), which corrects for the simulated disturbance optical axis jitter motions of the reference beacon 102 location. Thus, the present invention utilizes a precise and stable reference beacon source in conjunction with an accurate high resolution FSM.

In one exemplary embodiment, the beacon 102 can be operated in continuous wave (CW) or pulsed output illumination modes. If the beacon 102 is pulsed, the repetition rate should be consistent with the bandwidth limitations of the 2-D array 101 readout operations, frame rate readout cadence 111, 117, as well as the magnitude and bandwidth of the expected optical axis disturbance sources. The alignment beacon 102 output intensity should be well above (even to detector saturation if necessary) the expected scene irradiance levels, in order not to compete with the alignment beacon 102 edge detection threshold capability.

In one exemplary embodiment, the spectral column that contains the reference beacon image is read-out of the detector array at a 300 Hz-1 KHz frame-rate cadence. Changes in the illuminated column segment length will indicate beacon 102 motion in one axis, and changes in the illuminated column segment centroid location along the detector spectral column will indicate motion in the other orthogonal axis, i.e., tip and tilt.

In addition, in one embodiment, the alignment beacon 102 parameters (i.e., center wavelength and linewidth, beam divergence and pointing jitter, etc.) should also be consistent with the detector array 101 parameters (i.e., pixel pitch, wavelength responsivity, etc.) to achieve the desired level of range and resolution control accuracies. It should also be noted that the alignment beacon 102 instrument mounting and pointing axis provides the optical jitter and pointing control reference datum. All detected optical motions are measured and controlled relative to this reference. These key instrument component parameters should be consistent and factored into the overall instrument design architecture to ensure that proper motion monitor and control responsivity is achieved.

In one exemplary embodiment, FIG. 1B depicts an expanded image of the alignment beacon 109 (circle) as imaged onto a single wavelength-specific linear array column 110 within the 2-D spectrometer detector array 101. In one embodiment, the separate images in FIG. 1B illustrate the changes in the focal plane detector response (i.e., at 1064 nm detector column 110) due to optical component motions that alter focal plane image stability.

Accordingly, it should be noted that only the detector pixel column that corresponds to the beacon wavelength (i.e., 1064 nm column 110) will respond with a detector signal output shown in 109 and FIG. 1B. All other spectrometer adjacent columns that fall outside the alignment beacon wavelength will not be illuminated, registered or "seen"; i.e., the detector elements will be non-responsive. Although a broad wavelength beacon 102 can be used, most high-resolution science image applications would desire to retain as much spectral coverage as possible; thus, the wider the spectral width of the alignment beacon 102, the more spectral columns will be activated which then in-turn leaves less spectral coverage for the science application data 118. Accordingly, for this reason, a very narrow laser spectral bandwidth (<<1 nm) is recommended for the alignment beacon 102. The 1064 nm laser wavelength was selected on a non-interference basis based on the science application. Thus, the alignment beacon 102 wavelength—and optical bandwidth—are spectrally positioned so as to not interfere with the desired science wavelength range of interest 118 at the system focal plane. For example, if a user was interested in the visible wavelengths (350 nm to 700 nm), the user could select an alignment wavelength at, for example, 1064 nm with a bandwidth <0.5 nm.

Accordingly, in one exemplary embodiment, the system 100 optical design and layout is configured to segregate the desired wavelengths from the alignment beacon 102 wavelength in a non-interference design. The focused alignment beacon 102 is positioned (aligned) on the focal plane such that the linear detector array 101 will intersect the alignment beacon through a less-than "half-moon" segment of the focused alignment beacon image. It is important that the linear array detector column does not intersect the focused alignment beacon 102 directly through the center of the circular alignment beacon image. Rather, an offset intersection chord is required so that the misalignment motion direction detection can be uniquely registered.

In one embodiment, the detector frame rate for the science data of the spectrometer 101 of the present invention, is science application-specific, in addition to the desired instrument design parameters (i.e., scene resolution and radiometry, instrument aperture, detector responsivity, etc.). In one embodiment, the detector frame rate used for the alignment beam array column (wavelength specific) readout is closely related to the expected disturbance source profiles (i.e., vibration magnitude and spectrum, etc.), that will be coupled into the instrument optical system structure during operation.

In one embodiment, the expected disturbance input profiles will also be observation platform specific (ground based, aircraft, spacecraft, etc.) and subject to the mounting interface coupling characteristics. The desired range of jitter motion detection and compensation control should be consistent with key instrument hardware design parameters; i.e., fast steering mirror (FSM) 105 motion range and resolution, instrument detector array pixel instantaneous field-of-view (IFOV), etc.

In one exemplary embodiment, the present invention includes a closed-loop functional system for monitoring the optical axis tilt and tip motions.

In one exemplary embodiment, the optical axis monitoring and control system 100 monitors and controls (corrects) the boresight pointing vector alignment (tip and tilt) between the optical axis reference datum (alignment beacon 102 location), and the science system focal plane. As noted above, the alignment beacon 102 operating wavelength is selected to be in the spectrometer region that is not of scientific spectral interest 118 and still within the wavelength detection sensitivity of the 2-D science detector array columns. The optical beacon bandwidth should be similarly selected to be less than the equivalent spectrometer dispersion column resolution of the 2-D spectrometer detector array 101.

In one exemplary embodiment, a software control program 115 provided in memory and run by a processor of a computer system 114, controls alignment via a detector readout and "windowing" control electronics 111, a detector array readout and beacon position processing electronics 112, and a FSM feedback control 113. More specifically, one novel and unique feature of the present invention utilizes the "windowing" capability of some 2-D area arrays that allow for operating the single array as two separate arrays with independent timing and readout signals. This lends itself very well for push-broom spectrometer applications requiring precision pointing control. The main advantage of the present invention is that the precision pointing control does not require separate and dedicated pointing monitor circuitry which greatly simplifies the focal plane cost and implementation hardware.

Thus, the present invention's innovative measurement approach utilizes a single 2-D focal plane detector array 101 to collect the necessary science measurement image data 118, 116 while at the same time collecting the engineering optical axis motion detection and image control information 117. In one exemplary embodiment, the present invention utilizes the standardized "windowing" electronic control electronics 111 to readout a single column 117 (1-D array) within a 2-D spectrometer system 100, while the readout and control of the remaining 2-D array columns 116 are controlled by separate and independent frame-rate control electronics 112.

Specifically, in one exemplary embodiment, the detector array readout "windowing" capability is used to independently control and readout the wavelength specific linear array detector column at a readout cadence (i.e., nominally 100 Hz to 1 kHz frame rate—see arrow 117). The remaining detector array columns may be readout at a different and notionally much slower frame rate, i.e., 0.1 Hz to 1 Hz frame rate (see arrow 116). As noted above, these array windowing readout functions are controlled by dedicated array readout control electronics 111, 112.

In one embodiment, the above control function is one important feature that enables the innovative detection and control system 100 of the present invention. As stated above, the innovation of the present invention utilizes a wavelength specific single detector column within the same 2-D spectrometer array 101 in conjunction with the matching wavelength-specific collimated alignment beacon 102, 109 that is rigidly attached and aligned along the central optical boresight axis reference datum 103.

In one exemplary embodiment, the computer system 114 of the present invention executes a software program 115 to record the changes in the beacon-illuminated linear array segment length and segment centroid location, in a database 115, and translates this information via a feedback control system 113 into an appropriate FSM 105 signal to control/restore the alignment beacon 102 back to the aligned focal plane position. This monitor and feedback control system is operated at a sufficient closed-loop gain and bandwidth product consistent with the expected optical axis disturbance source(s) bandwidth, magnitude and coupling into the optical system mechanical layout.

In one exemplary embodiment, the alignment beacon beam divergence 109 will need to be selected in concert with the required detector pitch and the optical design parameters (i.e., required science scene image spatial resolution), in order to establish enough optical motion range and resolution detection capability consistent with the expected jitter source magnitude and frequency spectrum. In one embodiment, the alignment beacon optical axis is positioned along the focal plane optical axis such that the beacon monitor detector array column (beacon wavelength specific) intersects the alignment beacon image at a focal plane point that is not aligned through the center of the alignment beacon beam image, but rather at a chord location that is less than half the beacon beam image diameter distance (see FIG. 1B). Likewise, the alignment beacon beam image should fall onto or near the wavelength specific column such that the beam image intersection chord is at or near the array column mid-point spatial axis. The alignment beam beacon divergence should be selected to ensure that the focal plane beam image is smaller than the array column spatial FOV extent (see FIG. 1B). This beacon beam position, beacon image size and focal plane alignment will ensure that the image motion detection signals will be unique and non-ambiguous with respect to image motion magnitude and direction.

In one exemplary embodiment, typical laser beacon sources' optical bandwidths are such that this spectral detection can typically occur well within a single array column 110 with the 2-D spectrometer 101 dispersion axis (see FIG. 1A). Other alignment beacon sources could include wider optical bandwidth emitters (LED's, etc.); however, the maximum bandwidth would still need to be far enough removed from the scientific spectral interest to avoid contaminating the science data of interest.

In one exemplary embodiment, disturbance profiles and control stability profiles of the present invention are shown in FIGS. 3A and 3B. In the plots of FIGS. 3A and 3B, the results show that the closed loop control system of the present invention operates well and within the expected criteria. For example, a 1- to 2-pixel stability in both axis (tip and tilt) with a closed loop control bandwidth of 150 Hz, for a 2-axis input jitter disturbance source, was proved.

In one exemplary embodiment, FIG. 3B shows a plot of a continuous linear array output as a function of time, where the plot shows a stable (less than 2 pixels) and controlled array output image with an unchanging "length" measurements (tilt axis) while undergoing tilt input jitter depicted in FIG. 2A. FIG. 3B also indicates a stable and controlled "centroid" motion (tip axis) while undergoing the tip input jitter depicted in FIG. 2B.

In one exemplary embodiment, the control strategy architecture of the present invention is capable of sub-pixel motion detection and control with optimal system component selection. The closed loop system of the present invention confirms that the detection and control system operates successfully in controlling the boresight axis stability (FIGS. 3A and 3B) while undergoing tilt and tip optical axis disturbances (see FIGS. 2A-2B).

Figure 4:
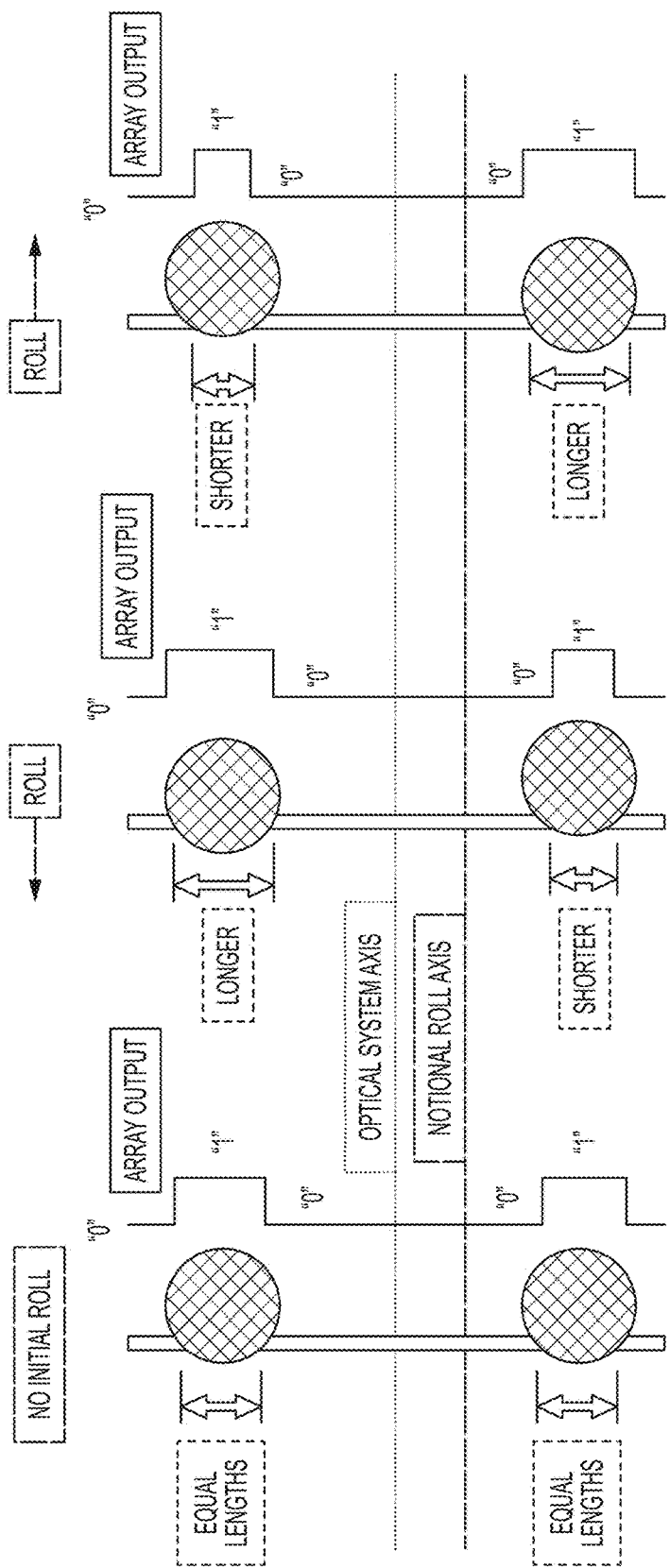
FIG. 4 illustrates the roll error measurement approach which utilizes two alignment beacons similar to the single beam alignment implementation. The two beams are aligned co-axially to the optical system boresight axis.

In one exemplary embodiment, the above technique of the present invention can be expanded to include two or more illumination beacons; thus, enabling optical axis roll motion detection. FIG. 4 illustrates the roll error measurement approach which utilizes two alignment beacons similar to the single beam alignment implementation. These two beams are aligned co-axially to the optical system boresight axis, and ideally, the dual beams are separated and positioned at the system focal plane wherein the optical system boresight axis as well as the notional roll disturbance axis (as shown) are in between the dual beam focal plane projection axes.

Thus, in one exemplary embodiment, roll detection and correction signals may be derived by the software program 112, 115, from the relative motions of the multiple (at least two) alignment beacons (see FIG. 4). This additional measurement strategy is very similar to the existing tilt/tip monitor and control system described herein. The multiple beacon sources may be generated a number of ways—i.e., by a diffractive optical element (DOE) or equivalent microlens design, or illuminated bifurcated fibers, etc. However, it is important that the beacon sources maintain fixed and pointing axis alignment relative to each other and the system optical axis bore-sight datum.

For example, in one exemplary embodiment, the two reference beacons should be spatially displaced at the focal plane but still align along the boresight axis and within the wavelength-specific detector array column length. Optical axis roll movements can be sensed by monitoring the change in the ratio between the pair of illumination beacon lengths that appear on the wavelength-specific detector array column. Importantly, when everything is aligned and stable, the two illuminated beacon lengths onto the wavelength-specific detector array column may be equal or near equal but will have a known fixed length ratio to each other. When the optical axis undergoes a roll disturbance, these two alignment beacons will have different illuminated segment lengths on the wavelength-specific detector array column. This change in the length ratio, magnitude and sense, will indicate the amount of roll and roll direction.

In one embodiment, this delta length ratio can be parametrically characterized such that feedback control signals can be derived. These control feedback signals can then be parametrically applied to reposition and null the roll axis beacon via a selected system rotation mechanism (i.e., focal plane, field stop, instrument boresight roll axis, etc.); thus, completing the closed loop control, to bring the optical axis back into proper roll axis alignment.

Accordingly, the present invention discloses a novel and unique feature which utilizes the "windowing" capability of some 2-D area detector arrays, that allow for operating the single array as two separate arrays, with independent timing and readout signals. This innovative monitoring system in conjunction with an in-line optical axis fast steering mirror (FSM) allows for the instrument optical axis pointing control to be corrected for unwanted tip and tilt motions during the image integration period, thus, avoiding the resultant image spatial crosstalk and image blurring artifacts thus greatly improving the measurement quality and the resultant science data product. One advantage of the present invention is that it does not require separate and dedicated pointing monitor circuitry, which greatly simplifies the focal plane cost and implementation hardware. The present invention can also be expanded to include two illumination beacons, thus, enabling optical axis roll motion detection.

The optical axis pointing monitor and control system of the present invention is suitable for applications such as a cross-track push-broom or wisk-broom spectrometer requiring precision pointing control, as well as 2-D array imaging sensors for orbital, airborne and/or ground based sensor applications. The integrated instrument boresight pointing control strategy of the present invention applies to any commercial (or government) imaging instrumentation as it relates to scene imaging, global and/or regional land usage classification, cataloging, population growth monitoring, agriculture utilization, crop health, land water resources, global open ocean dynamics and ocean coastal ecosystem environment monitoring.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A monitoring and control system for a spectrometer, comprising:
   a single axis, wavelength-specific linear array detector column embedded in a two-dimensional (2-D) spectrometer detector array;
   at least one optical alignment beacon positioned and directed along a central optical axis of an input aperture of an optical system;
   wherein said beacon outputs illumination directed along a receiver optical path;

a fast steering mirror (FSM) provided in series with said optical axis of said beacon and an incoming ground scene radiance from said input aperture;

wherein said FSM alters optical pointing directions of radiance sources including said incoming ground scene radiance and said beacon illumination, in two axes including tip and tilt axes;

a turning mirror which reflects said radiance sources to focusing optics and a field stop slit of a field stop assembly;

wherein exiting radiance from said field-stop assembly is spectrally partitioned and directed orthogonal to a spatial cross-track image axis and focused onto said 2-D spectrometer detector array; and wherein changes in tip and tilt optical axis motions are registered and parametrized to derive a feedback control signal from a feedback control system, for said FSM to provide corrective motions to image jitter and to restore focal plane image stability.

2. The system of claim 1, wherein said beacon is rigidly mounted to said input aperture and a pointing axis of said beacon output illumination serves as an optical axis boresight datum which is coaxial with said receiver optical path; and wherein said output illumination from said beacon is directed along said optical axis boresight datum, and re-imaged onto a focal plane of said 2-D spectrometer detector array, and registered at said wavelength-specific linear array detector column.

3. The system of claim 2, wherein said output illumination from said beacon focused on said focal plane of said 2-D spectrometer detector array illuminates a section of said linear array detector column; and wherein jitter motions of optical components positioned between said alignment beacon and said focal plane appear as motions of a beacon image on said wavelength-specific linear array detector column.

4. The system of claim 3, wherein misalignments in said optical axis motions translate into a change in each of an illuminated segment length and an illuminated segment centroid location along an axis of said wavelength-specific linear array detector column; and wherein said change in said illuminated segment length of said wavelength-specific linear array detector column indicates motion of said beacon in one axis, and said change in said illuminated segment centroid location along said linear array detector column indicates motion in a second orthogonal axis, to indicate said tip and tilt optical axis motions.

5. The system of claim 4, wherein said beacon is aligned on said focal plane such that said linear array detector column intersects a circular beacon image through an offset chord intersection, such that said changes in optical axis pointing direction are registered.

6. The system of claim 5, wherein said beacon operates in one of a continuous wave or a pulsed output mode.

7. The system of claim 6, further comprising:
an optical axis pointing control system which monitors and controls a vector alignment of said optical axis boresight datum and said focal plane of said 2-D spectrometer detector array.

8. The system of claim 7, further comprising:
a detector array control and readout which includes programmable windowing readout capability to independently control and readout said wavelength-specific linear array detector column at a readout cadence;

wherein array windowing readout functions are controlled by an array readout control electronics.

9. The system of claim 8, wherein changes in said illuminated segment length and said illuminated segment centroid location are recorded in a database; and wherein said feedback control system translates said changes into said feedback control signal for said FSM to restore said beacon pointing back to an aligned focal plane position and preserve said focal plane image stability.

10. The system of claim 9, wherein said wavelength-specific linear array detector column collects alignment beacon image data in order to determine optical axis motion and image control information.

11. The system of claim 10, wherein two or more alignment beacons are used to enable detection of optical axis roll motions.

12. The system of claim 1, wherein said beacon includes one of a diffractive optical element (DOE), a micro-lens, or illuminated bifurcated fibers with fixed output collimation.

13. The system of claim 11, wherein said two or more beacons are fixed and co-aligned to each other; and wherein said two or more beacons are spatially displaced at said focal plane and align along said optical axis boresight datum within said length of said wavelength-specific detector array column.

14. The system of claim 13, wherein roll motion detection and correction signals are derived from relative motions of said two or more co-aligned beacons.

15. The system of claim 14, wherein said optical axis roll motions are detected by monitoring a change in a ratio between an illumination segment length of each of said two or more beacons that appear on said wavelength-specific detector array column, to indicate a roll direction and magnitude.

16. The system of claim 15, wherein an initial position reference of said illumination segment length of each of said two or more beacons on said wavelength-specific detector array column are established and provide a known fixed length ratio datum.

17. The system of claim 16, wherein said change in ratio is parametrically characterized to derive said feedback control signal which is parametrically applied to said feedback control system, to reposition and null said beacon via a rotation restoration mechanism; and wherein said optical axis pointing control system and said feedback control system form a closed loop control system to maintain a desired optical axis alignment.

18. The system of claim 1, wherein said 2-D spectrometer detector array configuration is a push-broom spectrometer or a cross-track wisk-broom spectrometer; and wherein said optical axis pointing control system of said 2-D spectrometer detector array is used at a geosynchronous observation platform which provides image pointing control of said focal plane of less than ±1 arcsec or ±½ pixel control.

19. The system of claim 8, wherein said windowing capability of said detector array control and readout is used to independently control and readout said wavelength specific detector array column at a first readout cadence, and remaining detector array columns are readout at a second readout cadence.

20. A method of monitoring and controlling a system for a spectrometer, comprising:
providing a single axis, wavelength-specific linear array detector column embedded in a two-dimensional (2-D) spectrometer detector array;

positioning and directing at least one optical alignment beacon along a central optical axis of an input aperture of an optical system;

directing illumination outputted from said beacon along a receiver optical path;

providing a fast steering mirror (FSM) in series with said optical axis of said beacon and an incoming ground scene radiance from said input aperture;

altering optical pointing directions of radiance sources including said incoming ground scene radiance and said beacon illumination, in two axes including tip and tilt axes, using said FSM;

reflecting said radiance sources using a turning mirror to focusing optics and a field stop slit of a field stop assembly;

spectrally partitioning and directing exiting radiance from said field-stop assembly orthogonal to a spatial cross-track image axis and focusing onto said 2-D spectrometer detector array; and registering and parametrizing changes in tip and tilt optical axis motions to derive a feedback control signal from a feedback control system, for said FSM to provide corrective motions to image jitter, and to restore focal plane image stability.

21. The method of claim 20, wherein said beacon is rigidly mounted to said input aperture and a pointing axis of said beacon output illumination serves as an optical axis boresight datum which is coaxial with said receiver optical path; and wherein said output illumination from said beacon is directed along said optical axis boresight datum, and re-imaged onto a focal plane of said 2-D spectrometer detector array, and registered at said wavelength-specific linear array detector column.

22. The method of claim 21, wherein said output illumination from said beacon focused on said focal plane of said 2-D spectrometer detector array illuminates a segment of said linear array detector column; and wherein jitter motions of optical components positioned between said alignment beacon and said focal plane appear as motions of a beacon image on said wavelength-specific linear array detector column.

23. The method of claim 22, wherein misalignments in said optical axis motions translate into a change in each of an illuminated segment length and an illuminated segment centroid location along an axis of said wavelength-specific linear array detector column; and wherein said change in said illuminated segment length of said wavelength-specific linear array detector column indicates motion of said beacon in one axis, and said change in said illuminated segment centroid location along said linear array detector column indicates motion in a second orthogonal axis, to indicate said tip and tilt optical axis motions.

24. The method of claim 23, further comprising:
aligning said beacon on said focal plane such that said linear array detector column intersects a circular beacon image through an offset chord intersection, such that said changes in optical axis pointing direction are registered.

25. The method of claim 24, wherein said beacon operates in one of a continuous wave or a pulsed output mode.

26. The method of claim 25, further comprising:
monitoring and controlling a vector alignment of said optical axis boresight datum and said focal plane of said 2-D spectrometer detector array using an optical axis pointing control system.

27. The method of claim 26, further comprising;
independently controlling and performing a readout of said wavelength-specific linear array detector column at a readout cadence using a detector array control and readout which includes windowing capability;

wherein array windowing readout functions are controlled by an array readout control electronics.

28. The method of claim 27, further comprising:
recording changes in said illuminated segment length and said illuminated segment centroid location in a database; and translating said changes into said feedback control signal, using said feedback control system, for said FSM to restore said beacon pointing back to an aligned focal plane position and said focal plane image stability.

29. The method of claim 28, further comprising:
collecting alignment beacon image data using said linear array detector column, in order to determine optical axis motion and image control information.

30. The method of claim 29, wherein two or more beacons are used, to enable detection of optical axis roll motions.

31. The method of claim 20, wherein said beacon includes one of a diffractive optical element (DOE), a micro-lens, or illuminated bifurcated fibers with fixed output collimation.

32. The method of claim 30, wherein said two or more beacons are fixed and co-aligned to each other; and wherein said two or more beacons are spatially displaced at said focal plane and align along an optical axis of said optical axis boresight datum within a length of a wavelength-specific detector array column.

33. The method of claim 32, further comprising:
deriving roll motion detection and correction signals from relative motions of said two or more co-aligned beacons.

34. The method of claim 33, further comprising:
detecting said optical axis roll motions by monitoring a change in a ratio between said illumination segment length of each of said two or more beacons that appear on said wavelength-specific detector array column, to indicate a roll direction and magnitude.

35. The method of claim 34, wherein an initial position reference of said illumination segment length of each of said two or more beacons on said wavelength-specific detector array column are substantially equal with a known fixed length ratio.

36. The method of claim 35, further comprising:
parametrically characterizing said change in ratio to derive said feedback control signal which is parametrically applied to said feedback control system, to reposition and null said beacon via a rotation restoration mechanism;

wherein said optical axis pointing control system and said feedback control system form a closed loop control system to maintain a desired optical axis alignment.

37. The method of claim 20, wherein said 2-D spectrometer detector array is a push-broom spectrometer or a cross-track wisk-broom spectrometer; and wherein said optical axis pointing control system of said 2-D spectrometer detector array is used at a geosynchronous observation platform which provides image pointing control of said focal plane of less than ±1 arcsec or ±½ pixel control.

38. The method of claim 27, wherein said windowing capability of said detector array control and readout is used to independently control and readout said wavelength specific linear array detector column at a first readout cadence, and remaining detector array columns are readout at a second readout cadence.

* * * * *